Nov. 29, 1938.   H. A. BEEKHUIS, JR   2,138,016
PROCESS FOR THE PRODUCTION OF A NITRATE AND CHLORINE
Filed Feb. 19, 1937
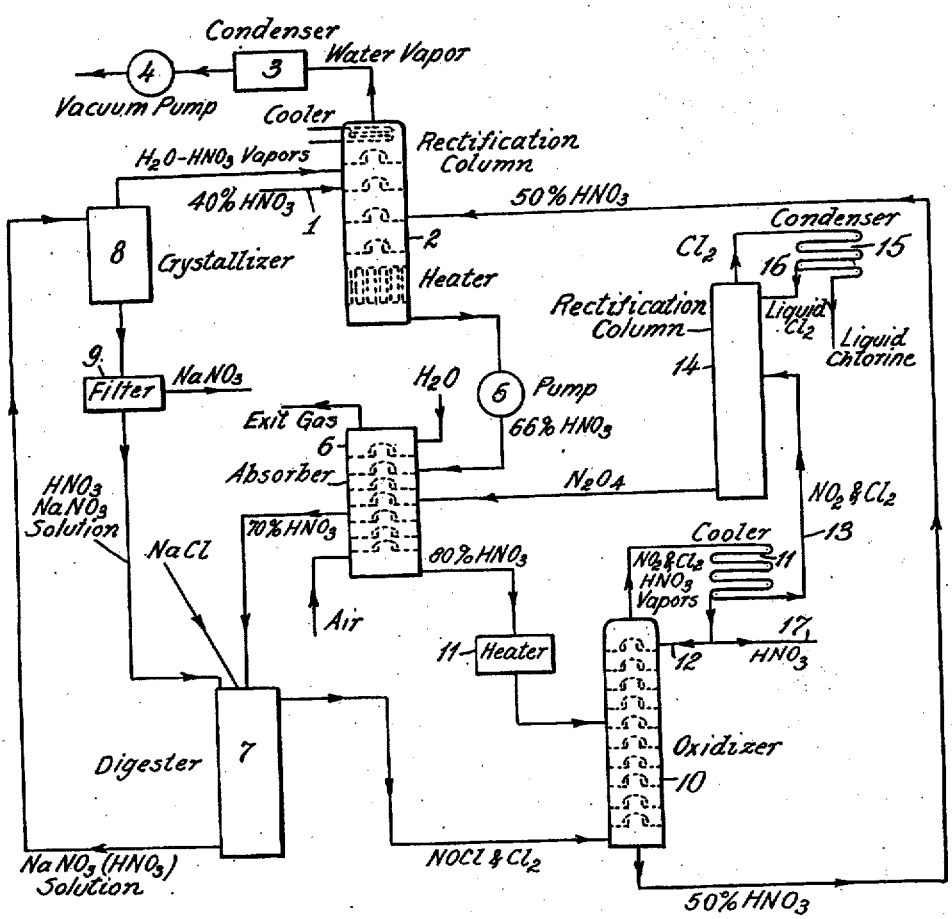
INVENTOR
Herman A. Beekhuis, Jr.
BY
ATTORNEY Patented Nov. 29, 1938

2,138,016

UNITED STATES PATENT OFFICE 2,138,016

PROCESS FOR THE PRODUCTION OF A NITRATE AND CHLORINE

Herman A. Beekhuis, Jr., Petersburg, Va., assignor to The Solvay Process Company, New York, N. Y., a corporation of New York Application February 19, 1937, Serial No. 126,619

15 Claims. (Cl. 23—102)

This invention relates to a process for the production of a nitrate by reaction of nitric acid with a metal chloride, for example with an alkali metal chloride such as sodium chloride or potassium chloride, an alkaline earth metal chloride such as calcium chloride, and the like. The invention is further directed to a process for treating the mixture of gases evolved by the reaction of the nitric acid and salt (which is substantially a mixture of nitrosyl chloride and chlorine) to recover the combined nitrogen in these gases in a form in which it may be utilized for the decomposition of additional salt. This invention makes it possible, therefore, to react nitric acid and a salt to obtain but two products; a nitrate and a substantially pure chlorine gas.

It is known that nitric acid when mixed with sodium chloride, for example, may be reacted with the sodium chloride to form sodium nitrate and to evolve from the reaction mixture gaseous nitrosyl chloride and chlorine. The nitrogen combined as nitrosyl chloride represents a loss of material in so far as the production of sodium nitrate is concerned. Furthermore, in order to obtain a pure chlorine product, it is necessary to remove the nitrosyl chloride from the mixture of gases evolved by the reaction of the salt and nitric acid.

Numerous methods have heretofore been proposed for treating the gas mixture of nitrosyl chloride and chlorine. For example, it has been proposed to heat the mixture of gases to decompose the nitrosyl chloride into chlorine and nitric oxide and after adding oxygen to oxidize the nitric oxide to nitrogen dioxide, to separate the chlorine and nitrogen dioxide by liquefaction and fractional distillation of the liquid. It has also been proposed to first separate the nitrosyl chloride from the chlorine, and then pass the nitrosyl chloride with oxygen in contact with water or dilute nitric acid. The objective of such processes is to convert the nitrosyl chloride into nitrogen dioxide and chlorine and to separately recover these materials. While such a process would appear to be rather simple to carry out, it is in fact difficult to successfully treat the mixture of chlorine and nitrosyl chloride to recover separately its content of chlorine, both free and combined, and combined nitrogen so that the combined nitrogen may be returned as nitric acid for use in decomposing additional metal chloride and the process may be operated to produce but two products—a nitrate and chlorine. The nitrosyl chloride is not completely decomposed and, as a result, the chlorine gas is largely contaminated with unoxidized nitrosyl chloride. Further, if the nitrosyl chloride is treated with water or dilute nitric acid at low temperatures, much of the nitrosyl chloride is combined with the water to form a mixture of nitric and hydrochloric acids. If the mixture of acids is heated to free it of chlorine compounds, the chlorine is again obtained as a mixture of nitrosyl chloride and chlorine.

It is an object of this invention to provide an economical process whereby nitric acid and a metal chloride may be converted into a nitrate and substantially all of the combined nitrogen supplied to the process as nitric acid may be recovered eventually in the form of the nitrate salt. It is a further object of this invention to provide a complete process for the production of a nitrate and chlorine from a relatively dilute nitric acid solution and a chloride, in which process the procedure for treating the gases evolved by the reaction of the acid and salt is so combined with the procedure for preparing the reaction mixture of salt and acid as to result in substantial improvements both in carrying out the reaction of the acid and salt and in the recovery of chlorine gas from the mixture of gases evolved by this reaction.

In its aspect as a complete process for the production of a nitrate from a relatively dilute nitric acid and a salt, the process of this invention, preferably, involves the following features:

A dilute nitric acid, which may be an aqueous acid containing 55% or less $HNO_3$, and preferably about 40% $HNO_3$ for example, is first concentrated by evaporation of water. Acid thus concentrated by evaporation is reacted with liquid $N_2O_4$ or highly concentrated $NO_2$ gas to enrich the acid and obtain a more concentrated nitric acid. This enriched acid is then mixed with a metal chloride such as sodium chloride and the mixture heated to form a solution of the corresponding nitrate, for example sodium nitrate, and evolve a mixture of nitrosyl chloride and chlorine gases. The nitrate solution is subjected to a cooling, with or without evaporation of water, to crystallize out nitrate which is recovered as the solid salt. The mother liquor from which nitrate has been recovered is returned and mixed with additional chloride and nitric acid and the mixture heated to form additional nitrate. The water introduced into the reaction mixture in the nitric acid supplied thereto may be evaporated from the mixture in which the reaction of the salt and nitric acid occurs, or from the nitrate solution while it is being treated to crystallize the nitrate or from both the reaction mixture and the nitrate solution.

The nitrosyl chloride formed by the reaction of the chloride and nitric acid is passed in contact with highly concentrated hot nitric acid to oxidize it to nitrogen dioxide and chlorine. The concentration and temperature of the nitric acid used for the treatment of the nitrosyl chloride are such that the nitrogen dioxide formed by oxidation of the nitrosyl chloride escapes from contact with the nitric acid as a gas mixed with the chlorine simultaneously produced and with the chlorine produced by the reaction of the metal chloride and nitric acid, when this chlorine accompanies the nitrosyl chloride as it is passed into contact with the nitric acid. The resulting mixture of nitrogen dioxide and chlorine is then treated to separate the two gases. This separation may be accomplished by cooling the mixture of $NO_2$ and chlorine to liquefy the nitrogen dioxide while the chlorine escapes as a relatively pure gas. The liquefied nitrogen dioxide or nitrogen tetroxide ($N_2O_4$), thus recovered is employed, either as the liquid or after vaporizing the liquid, for the enrichment of concentrated nitric acid as described above. Instead of liquefying the nitrogen dioxide to separate it from the chlorine, it may be absorbed in a material which selectively absorbs the nitrogen dioxide and from which a nitrogen oxide (preferably nitric oxide or nitrogen dioxide) may later be recovered or in a material which absorbs both the nitrogen dioxide and chlorine and from which nitrogen oxides may be selectively recovered. For example, the mixture of nitrogen dioxide and chlorine may be scrubbed with concentrated nitric acid, sulfuric acid or a mixture of the two acids to absorb the nitrogen dioxide, leaving a relatively pure chlorine gas. The nitrogen dioxide may then be recovered from solution in the acid by heating.

The invention will be more completely described by means of the following example of a process for the production of sodium nitrate and chlorine by the reaction of nitric acid and sodium chloride which is illustrated in the accompanying drawing, although the invention is not intended to be limited to this specific example.

Referring to the drawing, a dilute nitric acid containing 55% or less $HNO_3$, preferably about 40% $HNO_3$, such as may be prepared by the absorption of nitrogen oxides in water from gases obtained by oxidizing ammonia with air containing about 10% nitrogen oxides, is introduced from a pipe 1 into a rectification column 2. The nitric acid passes downwardly in this column in contact with vapors of steam and nitric acid evolved by heating the acid in the bottom of the column. After rectification by means of the incoming nitric acid and, if desired, a supplemental rectification at the top of the column by means of condensate condensed therein or by means of water introduced into the top of the column, the water vapor is withdrawn from the top of the column by means of a condenser 3 and vacuum pump 4. The rectification column is operated at a reduced pressure below atmospheric, for example under a pressure of 1½ pounds per square inch absolute.

A concentrated nitric acid containing 60% $HNO_3$ or more, preferably about 66% $HNO_3$, is drawn from the bottom of column 2 and passed by means of a pump 5 into the upper portion of an absorption column 6. Liquefied nitrogen dioxide ($N_2O_4$) or concentrated gaseous nitrogen dioxide is introduced into column 6. Oxygen gas, for example air, is also passed through column 6 in contact with the nitric acid and nitrogen dioxide therein. The materials in the column are maintained under the pressure of about 5 to about 10 atmospheres absolute or higher and preferably at temperatures ranging from not above 50° C. at the top of the tower to not above 75° C. at the bottom of the tower. The nitrogen dioxide reacts with the water in the nitric acid to form an enriched nitric acid containing 70% or more $HNO_3$ (on an $N_2O_4$ free basis; i. e., 70 parts $HNO_3$ to 30 parts $H_2O$), for example an acid containing 80% $HNO_3$ ($N_2O_4$ free basis), which is withdrawn from the bottom of column 6. The gases in the top of the column may be washed with a small amount of water to complete the absorption of the nitrogen dioxide before the nitrogen and excess unreacted oxygen escape from the column. The nitric acid drawn from column 6 may contain some nitrogen dioxide, which will be recovered and returned to column 6 in the subsequent treatment of the acid and gases evolved therefrom as described hereinafter.

The concentration of the nitric acid increases from the top toward the bottom of column 6. A portion of the acid is withdrawn from that portion of the column where the concentration has reached about 70% $HNO_3$. This 70% acid is passed to a vessel 7 in which it is reacted with sodium chloride to form sodium nitrate. The reaction mixture in vessel 7 is heated, preferably to temperatures of about 100° to 110° C. at the top of vessel 7 and the temperatures increase towards the bottom of the vessel up to the boiling point of the liquor being heated. This heating of the liquor in vessel 7 may be accomplished by boiling the liquor in the bottom of the vessel and passing the steam and vapors evolved from the boiling liquor upwardly in contact with a descending flow of reaction liquor which is thus heated to progressively higher temperatures. Under these conditions of operation, there is evaporated from the reaction liquor a substantial proportion of the water introduced with the incoming acid, this water escaping as vapor from the top of vessel 7 with the nitrosyl chloride and chlorine formed by reaction of the acid and salt. The reaction liquor at the top of vessel 7 is, however, at a temperature below its boiling point so that much of the steam evolved from the boiling liquid is condensed in the liquid with which it is contacted in vessel 7.

The hot sodium nitrate solution at a temperature approximating its boiling point is withdrawn from the bottom of vessel 7 and passed into a crystallizer 8. The proportions of nitric acid and salt introduced into vessel 7 are such that there is an excess of nitric acid over that amount required for complete reaction with the salt. There is, therefore, considerable free nitric acid in the sodium nitrate solution passed from vessel 7 into crystallizer 8. In crystallizer 8 the hot nitrate solution is subjected to a reduced pressure below atmospheric which causes water vapor to be evaporated from the solution, resulting in the solution being both concentrated and cooled. Sodium nitrate crystallizes from the solution and the resulting slurry is passed to a filter 9 where the nitrate is recovered.

The small amount of nitric acid passing off in the vapors leaving crystallizer 8 may be recovered, if desired, by passing these vapors through the upper portion of rectification column 2. Or this nitric acid may be recovered by scrubbing the vapors with a small amount of water and the resulting nitric acid solution may be introduced into rectification column 2. In case the vapors from crystallizer 8 are passed into column 2, the reduced pressure in the crystallizer may be maintained by means of condenser 3 and vacuum pump 4. The mother liquor containing nitric acid and sodium nitrate from filter 9 is returned to reaction vessel 7 where it is mixed with the salt and nitric acid supplied to this vessel and the nitric acid in the returned mother liquor serves to decompose additional salt to form sodium nitrate.

The hot nitrosyl chloride and chlorine gas from vessel 7 is introduced into the bottom of an oxidizer 10. The oxidizer as shown in the drawing, is a tower containing packing, a series of liquid-gas contact plates, or other means for insuring intimate contact between gases and vapors rising through the tower and a liquid descending therethrough. Enriched nitric acid containing about 80% HNO₃ (N₂O₄ free basis) drawn from the bottom of column 6 is heated to about 100° C. in a heater 11 and is then introduced into the mid-portion of oxidizer 10, down which the acid passes in intimate contact with the rising nitrosyl chloride-chlorine gas. Instead of heating the nitric acid prior to introducing it into oxidizer 10, heat may be supplied to the acid in the oxidizer. Whichever method of supplying the heat is employed, sufficient heat is supplied so that at some point in oxidizer 10 between that at which the acid is supplied and that at which the nitrosyl chloride-chlorine gas is introduced, a temperature is obtained above 80° C. and preferably a temperature of 100° C.

The vapors passing through the upper portion of oxidizer 10 above the point of entry of the enriched nitric acid, are refluxed with a condensate obtained by cooling the vapors in a cooler 11. Condensate from this cooler is returned to the top of oxidizer 10 through a pipe 12. The rate of feeding the enriched acid to oxidizer 10 is so regulated with respect to the temperature maintained in oxidizer 10 and the rate of flow of nitrosyl chloride-chlorine gas therethrough that the condensate formed in cooler 11 is an aqueous nitric acid containing about 90% HNO₃ or more (N₂O₄ free basis), preferably 98% to 100% HNO₃ (N₂O₄ free basis). Under these conditions there is a practically complete decomposition of the nitrosyl chloride by means of the hot concentrated nitric acid and substantially all of the water vapor accompanying the nitrosyl chloride-chlorine gas is condensed in oxidizer 10 and a dry nitrogen dioxide-chlorine gas passes from cooler 11 through a pipe 13. This drying of the gas is of particular value where the nitrogen dioxide and chlorine are to be separated by liquefaction of the nitrogen dioxide, as in the process illustrated in Fig. 1. By treating the gas to remove substantially all of its water vapor content while the gas is in contact with concentrated nitric acid, reaction of nitrogen dioxide, chlorine and water vapor to reform nitrosyl chloride is substantially excluded both while the nitrosyl chloride is being oxidized and after the oxidized gas has left contact with the nitric acid. Where the nitrogen dioxide-chlorine gas is subsequently treated with concentrated nitric acid to separate the nitrogen dioxide from the chlorine, the production of a dry gas is of relatively less importance, since the nitric acid will prevent the formation of nitrosyl chloride during the separation of the nitrogen dioxide from the chlorine.

As a result of the condensation of water vapor from the gases treated with the enriched nitric acid, and as a result of some of the nitric acid being used up by reaction with the nitrosyl chloride, the acid passing out of the bottom of oxidizer 10 is relatively more dilute than the enriched acid introduced into the oxidizer. For example, the acid leaving the oxidizer may contain about 50% HNO₃. This acid is passed into rectification column 2, where it is concentrated along with the 40% nitric acid supplied to this column, and the concentrated acid is then enriched in column 6 for use in vessel 7 and in oxidizer 10.

The nitrogen dioxide-chlorine gas from the oxidizer 10, after being cooled in cooler 11 to a temperature of about 30° C., is then introduced into the mid-portion of a rectification column 14. In this rectification column the entering gas passes upwardly in the upper portion of the column and is intimately contacted with downwardly flowing liquid chlorine which is passed from a condenser 15 through a pipe 16 to the top of column 14. Sufficient liquid chlorine is thus introduced into column 14 and refluxed in contact with the nitrogen dioxide-chlorine gas mixture to substantially free the gas of nitrogen dioxide. A pure chlorine gas passes off from the top of the column to condenser 15 where it is cooled to condense the chlorine. The condensed chlorine, other than that portion returned to column 14, is drawn from condenser 15 as one of the products of the process.

The liquid chlorine refluxing downwardly in rectification column 14 cools and condenses or absorbs the nitrogen dioxide in the gases introduced into the column. The thus liquefied nitrogen dioxide flows to the bottom of the column, where it is heated and the vapors evolved are passed upwardly through the bottom portion of the column in contact with the liquid flowing downwardly therein. The heated vapors free the liquid of chlorine. A substantially pure liquefied nitrogen dioxide is drawn from the bottom of rectification column 14 and, either as the liquid or after being vaporized to form a concentrated nitrogen dioxide gas, is introduced into column 6 in which it serves to enrich the concentrated nitric acid in the manner described above.

Numerous changes and modifications may be made in the example described without departing from the invention. For example, instead of passing all of the concentrated acid from column 2 to column 6, a portion of the 66% nitric acid may be passed directly to reaction vessel 7 and the remaining portion treated in column 6 to enrich it to 80% HNO₃. The amount of acid thus enriched should be sufficient to provide the desired flow of concentrated nitric acid to oxidizer 10 and in addition sufficient enriched acid, which is passed into reaction vessel 7, so that the 66% acid and the enriched 80% acid passed to vessel 7 taken together are equivalent to an acid containing about 70% HNO₃.

Instead of treating the mixture of nitrosyl chloride and chlorine with nitric acid, the nitrosyl chloride may first be separated from the chlorine and then passed in contact with the acid to oxidize it to nitrogen dioxide and chlorine.

In carrying out the step of my process in which the nitrosyl chloride is oxidized by nitric acid, the nitrosyl chloride is contacted with a concentrated nitric acid at an elevated temperature such that it is decomposed by reaction with the nitric acid and the nitrogen dioxide formed escapes as a gas from contact with the nitric acid. To accomplish this decomposition of the nitrosyl chloride, a concentrated nitric acid containing about 70% or more HNO₃ (preferably containing about 75% to about 80% HNO₃) is introduced into contact with nitrosyl chloride gas. This may be accomplished in various manners. For example, the nitrosyl chloride and nitric acid may be passed in countercurrent flow with each other or the nitrosyl chloride may be passed through a body of the nitric acid contained in a vessel. Whatever the manner in which the gas and acid are contacted with each other, at the point at which the gas is last contacted with the acid a concentration of acid corresponding to about 70% HNO₃ or stronger is maintained. Further, the gas is contacted with the concentrated acid (70% HNO₃ or stronger) at temperatures of about 50° C. or higher (preferably at temperatures of about 70° C. to about 110° C.). In thus operating the concentration of nitric acid contacted with the nitrosyl chloride gas determines the composition of the gas phase present, in which it appears the reaction of the nitrosyl chloride and chlorine may take place. In contacting the heated acid and gas as described, the gas containing nitrosyl chloride and vapors of nitric acid and water evolved from the acid are heated at temperatures of about 50° C. or higher, and while thus heating the mixture of gas and vapors, to oxidize the nitrosyl chloride, nitric acid is vaporized from the 70% or stronger acid and the nitric acid vapors are introduced into a gas mixture in amount such that there are 70 parts by weight or more of nitric acid vapor to every 30 parts of water vapor in the mixture. This high ratio of nitric vapor to water vapor promotes a large degree of oxidation of the nitrosyl chloride. After the nitrosyl chloride gas has been mixed with these proportions of acid and water vapors and heated to oxidize the nitrosyl chloride, 70 parts by weight or more of nitric acid vapor for every 30 parts of water vapor is maintained in the gas containing nitrogen dioxide and chlorine resulting from oxidation of the nitrosyl chloride in order to prevent reformation of nitrosyl chloride by reaction of the nitrogen dioxide, chlorine and water.

The method for treating the nitrosyl chloride with nitric acid described in the foregoing example is in accordance with the process described and claimed in my copending United States application Serial No. 126,621, filed February 19, 1937. In that process the nitrosyl chloride gas is passed in contact with hot concentrated nitric acid under conditions such that the gas is contacted with acid of a concentration corresponding to an aqueous nitric acid containing 70% or more HNO₃ and is subsequently contacted with an acid of higher concentration. The process may be carried out by passing the nitrosyl chloride gas in contact with the hot concentrated nitric acid, cooling the resulting mixture of gases and vapors containing water vapor and nitric acid vapor evolved from the hot concentrated acid and chlorine and nitrogen dioxide resulting from decomposition of the nitrosyl chloride, to condense water and nitric acid, and refluxing the condensate thus formed in contact with the gases and vapors resulting from the treatment of the nitrosyl chloride gas with the hot concentrated nitric acid. A concentrated nitric acid having vapor pressures of HNO₃ and H₂O such that the composition of vapors evolved from the acid when it is heated at a temperature between 50° C. and its boiling point corresponds to 70 parts or more by weight of HNO₃ to every 30 parts of H₂O, should be introduced into contact with the nitrosyl chloride. For an aqueous nitric acid solution, this corresponds to an acid containing 70% or more HNO₃.

It is preferred to employ for the treatment of the nitrosyl chloride gas an acid containing about 75% to about 85% HNO₃. The concentrated acid and nitrosyl chloride gas should be contacted at an elevated temperature of 50° C. or higher and in proportions such that there is an excess of HNO₃ present for reaction with the nitrosyl chloride over that corresponding to the equation:

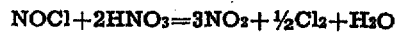

$$NOCl + 2HNO_3 = 3NO_2 + \tfrac{1}{2}Cl_2 + H_2O$$

This requires supplying more than two mols of HNO₃ for every 1 mol of NOCl. Preferably the 70% or stronger nitric acid is at about 80° C. or higher at some point at which it is contacted with the nitrosyl chloride. The degree of cooling the gases and vapors arising from the treatment of the nitrosyl chloride gas with the hot concentrated nitric acid to condense water vapor and nitric acid therefrom and the extent of refluxing the condensate in contact with the gases and vapors, is preferably such that a condensate is produced and refluxed in contact with the gases and vapors which contains nitric acid and water corresponding to about 80% or more HNO₃. It is also preferred to treat the gases and vapors with refluxed condensate at a temperature of about 60° C. or higher. Particularly when the gas is to be treated later to liquefy the nitrogen dioxide and separate it from the chlorine, the cooling of the vapors and the refluxing of the condensate with the rising vapors and gas is preferably so regulated that the condensate with which the gases and vapors last pass in contact is a nitric acid solution containing about 90% HNO₃ or more (N₂O₄ free basis), preferably one containing 98% to 100% HNO₃ (N₂O₄ free basis). By thus operating, the nitrogen dioxide and chlorine gas obtained from the oxidation of nitrosyl chloride will contain such a low proportion of water vapor that in the subsequent treatment of this gas there will be substantially no reaction between water vapor, nitrogen dioxide and chlorine to reform nitrosyl chloride.

The gas passing from the top of vessel 7 to oxidizer 10 may contain, in addition to water vapor, nitrosyl chloride and chlorine, substantial quantities of nitric acid or nitrogen oxides. The process of this invention is of particular value for treating such a gas mixture, since it serves in the same steps used for oxidizing the nitrosyl chloride and recovering the resulting nitrogen dioxide, to recover the nitric acid and nitrogen oxides already present in the gas to be treated.

If desired, a portion of the highly concentrated nitric acid condensed in cooler 11 may be withdrawn from the process through a pipe 17. In thus withdrawing nitric acid from the process additional acid may be supplied, preferably as 40% nitric acid introduced into rectification column 2, to compensate for that withdrawn from cooler 11.

Instead of separating the nitrogen dioxide and chlorine by liquefaction of the nitrogen dioxide as in the process described above, other methods may be employed for this purpose. For example, the nitrogen dioxide-chlorine gas from the oxidation step may be introduced into the bottom of an absorber or tower in which it is scrubbed with nitric acid containing about 90% or more HNO₃ at a temperature of about 40° C. or lower. The nitrogen dioxide and any small amount of residual undecomposed NOCl in the gas from the oxidation is absorbed in the nitric acid and a substantially pure chlorine gas escapes from the top of the absorber. The solution of nitrogen dioxide in nitric acid drawn from the bottom of the absorber may be heated to evolve the nitrogen dioxide. The nitric acid after yielding up the dissolved nitrogen dioxide may be cooled to a temperature of about 40° C. or lower and again introduced into the absorber.

Instead of using nitric acid to absorb the nitrogen dioxide, this may be done by means of sulfuric acid of a concentration above 70% $H_2SO_4$ or more at a temperature of about 40° C. or lower. The absorbed nitrogen dioxide may be recovered by heating the sulfuric acid solution. A mixture of nitric and sulfuric acids may also be employed, as for example a mixed acid containing 75% $HNO_3$, 20% $H_2SO_4$ and 5% $H_2O$. In order to prevent nitrosyl chloride formation, the concentration of water in these absorption liquids should be such that they have a water vapor pressure of about 1 mm. of mercury or lower at a temperature of 25° C.

In employing concentrated nitric acid in the manner described above for the oxidation of the nitrosyl chloride, the gas leaving the oxidation treatment will contain but little undecomposed nitrosyl chloride. However, the subsequent treatment of the nitrogen dioxide-chlorine gas to separately recover the nitrogen dioxide and the method of utilizing the recovered nitrogen dioxide of this application are particularly well suited for taking care of any undecomposed nitrosyl chloride leaving the gas from the oxidation step. Accordingly, the example described above may be modified to oxidize the nitrosyl chloride by other means as, for example, by passing it together with oxygen in contact with a hot catalyst or by passing it in countercurrent flow through a tower into the top of which hot nitric acid at a concentration of above 70% $HNO_3$ is introduced and this hot concentrated acid oxidizes the major portion of the nitrosyl chloride.

In such cases, where the gas leaving the oxidation step contains a substantial proportion of nitrosyl chloride, the undecomposed nitrosyl chloride is preferably recovered together with the nitrogen dioxide separate from the chlorine. For example, in liquefying the nitrogen dioxide the nitrosyl chloride may be liquefied and recovered with the nitrogen dioxide. When the nitrogen dioxide either as liquid or gas is then treated in absorber 6 with concentrated nitric acid at temperatures below 50° C., the nitrosyl chloride accompanying the nitrogen dioxide is absorbed in the acid and accompanies the acid returned to digester 7 or oxidizer 10. Upon the acid being warmed in the digester or the oxidizer, the nitrosyl chloride is evolved and passes to the oxidation step where it is again partially oxidized. In this manner all of the chlorine, both free and combined as nitrosyl chloride in the gases leaving the digester, is eventually recovered from the process as free chlorine.

In employing concentrated nitric acid for the separation of the chlorine and nitrogen dioxide, the nitrosyl chloride is absorbed in the nitric acid and recovered with the desorbed nitrogen dioxide. In employing concentrated sulfuric acid for the absorption of the nitrogen dioxide and nitrosyl chloride, nitrosyl-sulfuric acid is formed from the nitrosyl chloride and upon heating the sulfuric acid containing dissolved nitrogen dioxide and nitrosyl-sulfuric acid a gas containing both nitrogen dioxide and nitric oxide is evolved. In reacting this gas with aqueous nitric acid and oxygen the nitric oxide is oxidized to nitrogen dioxide and reacts to form nitric acid.

As indicated above, one of the advantages of employing concentrated nitric acid or a mixture of sulfuric and nitric acids for the absorption of the nitrogen dioxide in a gas containing it together with chlorine is that the gas leaving the step in which it is oxidized by hot nitric acid need not be completely dried in order to prevent reformation of nitrosyl chloride during the further treatment of the gas at temperatures of about 40° C. or lower to separate the nitrogen dioxide from the chlorine. By having concentrated nitric acid containing about 90% $HNO_3$ or more present during this separation, the reformation of nitrosyl chloride is prevented.

I claim:

1. The process for the production of a nitrate and chlorine from nitric acid and a metal chloride which comprises treating aqueous nitric acid containing below 70% $HNO_3$ with nitrogen dioxide and oxygen to enrich the acid and to produce an acid containing substantially 70% or more $HNO_3$, reacting acid, thus enriched, with a metal chloride at an elevated temperature to form a nitrate, nitrosyl chloride and chlorine, oxidizing said nitrosyl chloride to nitrogen dioxide and chlorine, separating the nitrogen dioxide from the chlorine and employing the nitrogen dioxide thus obtained for the enrichment of the aforesaid aqueous nitric acid.

2. The process for the production of a nitrate and chlorine from nitric acid and a metal chloride which comprises concentrating an aqueous nitric acid solution containing 55% or less $HNO_3$ by evaporation of water therefrom, reacting the thus concentrated nitric acid with nitrogen dioxide and oxygen to enrich the acid and to produce an acid containing substantially 70% or more $HNO_3$, reacting acid thus enriched with a metal chloride at an elevated temperature to form a nitrate and to evolve a gaseous mixture of nitrosyl chloride and chlorine, oxidizing said nitrosyl chloride to nitrogen dioxide and chlorine, separating the nitrogen dioxide from the chlorine in the resulting gaseous mixture, and reacting the thus separated nitrogen dioxide with the aforesaid concentrated nitric acid to enrich the acid.

3. The process for the production of a nitrate and chlorine from nitric acid and a metal chloride which comprises treating aqueous nitric acid containing below 70% $HNO_3$ with nitrogen dioxide and oxygen to enrich the acid and to produce an acid containing substantially 70% or more $HNO_3$, reacting acid thus enriched with a metal chloride at an elevated temperature to form a nitrate, nitrosyl chloride and chlorine, passing said nitrosyl chloride in contact with another portion of said enriched nitric acid at a temperature at which the nitrosyl chloride is oxidized to nitrogen dioxide and a gaseous mixture containing said nitrogen dioxide and chlorine escapes from contact with the acid, separating the nitrogen dioxide from the chlorine and employing the nitrogen dioxide thus obtained for the enrichment of the aforesaid aqueous nitric acid.

4. The process for the production of a nitrate and chlorine from nitric acid and a metal chloride which comprises concentrating an aqueous nitric acid solution containing 55% or less $HNO_3$ by evaporation of water therefrom, reacting the thus concentrated nitric acid with nitrogen dioxide and oxygen to enrich the acid and to produce an acid containing substantially 70% or more HNO₃, reacting a portion of the acid thus enriched with a metal chloride at an elevated temperature to form a nitrate and to evolve a gaseous mixture of nitrosyl chloride and chlorine, passing said gaseous mixture in contact with another portion of said enriched nitric acid which contains substantially 70% or more HNO₃ at a temperature at which the nitrosyl chloride is oxidized to nitrogen dioxide and a gaseous mixture containing said nitrogen dioxide and chlorine escapes from contact with the acid, separating the nitrogen dioxide from the chlorine in the resulting gaseous mixture, and reacting the thus separated nitrogen dioxide with the aforesaid concentrated nitric acid to enrich the acid.

5. The process for the production of a nitrate and chlorine from nitric acid and a metal chloride which comprises reacting nitric acid and a metal chloride at an elevated temperature to form a solution of a nitrate and evolve a gaseous mixture of nitrosyl chloride and chlorine, passing said gaseous mixture in contact with nitric acid containing 70% or more HNO₃ at a temperature of substantially 50° C. or higher to oxidize the nitrosyl chloride to nitrogen dioxide and chlorine, separating the nitrogen dioxide from the chlorine, passing the thus separated nitrogen dioxide and oxygen in contact with aqueous nitric acid to enrich the acid by reaction of nitrogen dioxide with water contained therein to form nitric acid containing 70% or more HNO₃, and employing acid thus enriched to 70% or more HNO₃ for the treatment of the aforesaid metal chloride.

6. The process for the production of a nitrate and chlorine from nitric acid and a metal chloride which comprises reacting nitric acid and a metal chloride at an elevated temperature to form a solution of a nitrate and evolve a gaseous mixture of nitrosyl chloride and chlorine, passing said gaseous mixture in contact with enriched nitric acid containing substantially 70% or more HNO₃ at a temperature of substantially 50° C. or higher to oxidize the nitrosyl chloride to nitrogen dioxide and chlorine, separating the nitrogen dioxide from the chlorine, passing the thus separated nitrogen dioxide and oxygen in contact with nitric acid containing below substantially 70% HNO₃ to form an enriched acid containing substantially 70% or more HNO₃, passing acid thus enriched to substantially 70% or more HNO₃ in contact with the aforesaid gaseous mixture of nitrosyl chloride and chlorine to oxidize the nitrosyl chloride and employing another portion of said enriched acid for reaction with the aforesaid metal chloride.

7. The process for the production of a nitrate from nitric acid and a metal chloride which comprises evaporating an aqueous solution of nitric acid containing about 40% HNO₃ to concentrate it, reacting thus concentrated acid with nitrogen dioxide and oxygen to form an enriched acid containing substantially 70% or more HNO₃, reacting a portion of the enriched acid with a metal chloride to form a nitrate solution and to evolve gaseous nitrosyl chloride and chlorine, passing the gaseous nitrosyl chloride and chlorine in contact with another portion of the said enriched nitric acid containing substantially 70% or more HNO₃ to oxidize the nitrosyl chloride to nitrogen dioxide and chlorine at an elevated temperature at which the nitrogen dioxide and chlorine escape as gas from contact with the acid, separating the thus formed nitrogen dioxide from the chlorine, and passing the thus separated nitrogen dioxide in contact with the aforesaid concentrated nitric acid to enrich said acid.

8. The process for the production of a nitrate and chlorine from nitric acid and a metal chloride which comprises treating aqueous nitric acid with nitrogen dioxide and oxygen to enrich the acid, separately utilizing portions of the thus enriched acid by reacting one portion with a metal chloride at an elevated temperature to form a nitrate, nitrosyl chloride and chlorine and passing said nitrosyl chloride in contact with a second portion of said enriched nitric acid at a temperature at which the nitrosyl chloride is oxidized to nitrogen dioxide and a gaseous mixture containing said nitrogen dioxide and chlorine escapes from contact with the acid, and withdrawing from contact with the nitrosyl chloride the aqueous solution resulting from reaction of the nitrosyl chloride with said second portion of enriched acid without permitting said aqueous solution to mingle with the first mentioned portion of enriched acid which is reacted with said metal chloride.

9. The process for the production of a nitrate from nitric acid and a metal chloride which comprises evaporating an aqueous solution of nitric acid containing about 40% HNO₃ to concentrate it, reacting thus concentrated acid with nitrogen dioxide and oxygen to form an enriched acid containing substantially 70% HNO₃, reacting a portion of the enriched acid with a metal chloride to form a nitrate solution and to evolve gaseous nitrosyl chloride and chlorine, further enriching another portion of the acid to form an acid containing substantially 80% HNO₃, passing the aforesaid gaseous nitrosyl chloride and chlorine in contact with the enriched nitric acid containing substantially 80% HNO₃ to oxidize the nitrosyl chloride to nitrogen dioxide and chlorine at a temperature of substantially 50° C. or higher, separating the nitrogen dioxide thus obtained from the chlorine, and passing the thus separated nitrogen dioxide in contact with the aforesaid concentrated nitric acid to enrich said acid.

10. The process for the treatment of a gas containing nitrosyl chloride which comprises passing said gas in contact with nitric acid at a temperature at which the nitrosyl chloride is oxidized to nitrogen dioxide and chlorine and the nitrogen dioxide and chlorine escape as a gas from contact with the nitric acid, separating the nitrogen dioxide from the chlorine, passing the thus separated nitrogen dioxide and oxygen in contact with aqueous nitric acid to enrich the acid by reaction of nitrogen dioxide with water contained therein to form nitric acid, and employing acid thus enriched to 70% or more HNO₃ as the aforesaid nitric acid with which said nitrosyl chloride is contacted to oxidize it.

11. The process for the treatment of a gas containing nitrosyl chloride which comprises heating at temperatures of which substantially 50° C. or higher a mixture of said gas and vapors of nitric acid and water to oxidize the nitrosyl chloride forming nitrogen dioxide and chlorine, and while heating said mixture at 50° C. or higher introducing into the heated mixture nitric acid vapor in amount such that there is present in the mixture 70 parts or more of HNO₃ vapor for every 30 parts of water vapor, and thereafter maintaining in the gas containing nitrogen dioxide and chlorine resulting from reaction of the nitric acid and nitrosyl chloride 70 parts or more of $HNO_3$ vapor for every 30 parts of water vapor.

12. The process for the treatment of a gas containing nitrosyl chloride which comprises passing said gas in contact with nitric acid containing 70% or more $HNO_3$ at a temperature of substantially 50° C. or higher and maintaining at the point where the gas is last contacted with the acid an acid of a concentration corresponding to 70% $HNO_3$ or stronger, whereby the nitrosyl chloride is oxidized to nitrogen dioxide and chlorine.

13. The process for the treatment of a gas containing nitrosyl chloride which comprises passing said gas in contact with nitric acid containing 70% or more $HNO_3$ at a temperature of substantially 50° C. or higher, maintaining at the point where the gas is last contacted with the acid an acid of a concentration corresponding to 70% $HNO_3$ or stronger and contacting the nitric acid and gas in the proportions of more than 2 mols of $HNO_3$ for every 1 mol of NOCl in the gas, whereby the nitrosyl chloride is oxidized to nitrogen dioxide and chlorine.

14. In a process for the treatment of a gas containing nitrosyl chloride that improvement which comprises oxidizing said nitrosyl chloride to nitrogen dioxide and chlorine by passing said gas in direct contact with hot nitric acid containing 70 parts or more $HNO_3$ for every 30 parts $H_2O$, withdrawing the resulting gaseous oxidation products of the nitrosyl chloride from contact with acid containing 70 parts $HNO_3$ or more to every 30 parts $H_2O$, and then cooling said gaseous oxidation products to a temperature at which vapors of nitric acid and water contained therein are condensed.

15. In a process for the treatment of a gas containing nitrosyl chloride that improvement which comprises oxidizing said nitrosyl chloride to nitrogen dioxide and chlorine by passing said gas in direct contact with hot nitric acid containing 70 parts or more $HNO_3$ for every 30 parts $H_2O$, withdrawing the resulting gaseous oxidation products of the nitrosyl chloride from contact with acid containing 70 parts $HNO_3$ or more to every 30 parts $H_2O$, then cooling said gaseous oxidation products to a temperature at which the vapors of nitric acid and water contained therein are condensed, separating the aqueous condensate thus obtained from the uncondensed nitrogen dioxide and chlorine contained in said gaseous oxidation products, and then further cooling the thus dried nitrogen dioxide and chlorine to liquefy the nitrogen dioxide.

HERMAN A. BEEKHUIS, JR.

CERTIFICATE OF CORRECTION.

Patent No. 2,138,016. November 29, 1938.

HERMAN A. BEEKHUIS, JR.

It is hereby certified that error appears in the printed specification of the above numbered patent requiring correction as follows: Page 3, first column, line 14, for "The oxidizer" read This oxidizer; second column, line 14, strike out the word "then"; page 4, first column, line 34, after "nitric" insert acid; page 6, second column, line 66, claim 11, strike out the word "which"; and that the said Letters Patent should be read with this correction therein that the same may conform to the record of the case in the Patent Office.

Signed and sealed this 10th day of January, A. D. 1939.

Henry Van Arsdale (Seal) Acting Commissioner of Patents.

ide and chlorine resulting from reaction of the nitric acid and nitrosyl chloride 70 parts or more of $HNO_3$ vapor for every 30 parts of water vapor.

12. The process for the treatment of a gas containing nitrosyl chloride which comprises passing said gas in contact with nitric acid containing 70% or more $HNO_3$ at a temperature of substantially 50° C. or higher and maintaining at the point where the gas is last contacted with the acid an acid of a concentration corresponding to 70% $HNO_3$ or stronger, whereby the nitrosyl chloride is oxidized to nitrogen dioxide and chlorine.

13. The process for the treatment of a gas containing nitrosyl chloride which comprises passing said gas in contact with nitric acid containing 70% or more $HNO_3$ at a temperature of substantially 50° C. or higher, maintaining at the point where the gas is last contacted with the acid an acid of a concentration corresponding to 70% $HNO_3$ or stronger and contacting the nitric acid and gas in the proportions of more than 2 mols of $HNO_3$ for every 1 mol of $NOCl$ in the gas, whereby the nitrosyl chloride is oxidized to nitrogen dioxide and chlorine.

14. In a process for the treatment of a gas containing nitrosyl chloride that improvement which comprises oxidizing said nitrosyl chloride to nitrogen dioxide and chlorine by passing said gas in direct contact with hot nitric acid containing 70 parts or more $HNO_3$ for every 30 parts $H_2O$, withdrawing the resulting gaseous oxidation products of the nitrosyl chloride from contact with acid containing 70 parts $HNO_3$ or more to every 30 parts $H_2O$, and then cooling said gaseous oxidation products to a temperature at which vapors of nitric acid and water contained therein are condensed.

15. In a process for the treatment of a gas containing nitrosyl chloride that improvement which comprises oxidizing said nitrosyl chloride to nitrogen dioxide and chlorine by passing said gas in direct contact with hot nitric acid containing 70 parts or more $HNO_3$ for every 30 parts $H_2O$, withdrawing the resulting gaseous oxidation products of the nitrosyl chloride from contact with acid containing 70 parts $HNO_3$ or more to every 30 parts $H_2O$, then cooling said gaseous oxidation products to a temperature at which the vapors of nitric acid and water contained therein are condensed, separating the aqueous condensate thus obtained from the uncondensed nitrogen dioxide and chlorine contained in said gaseous oxidation products, and then further cooling the thus dried nitrogen dioxide and chlorine to liquefy the nitrogen dioxide.

HERMAN A. BEEKHUIS, Jr.

CERTIFICATE OF CORRECTION.

Patent No. 2,138,016. November 29, 1938.

HERMAN A. BEEKHUIS, JR.

It is hereby certified that error appears in the printed specification of the above numbered patent requiring correction as follows: Page 3, first column, line 14, for "The oxidizer" read This oxidizer; second column, line 14, strike out the word "then"; page 4, first column, line 34, after "nitric" insert acid; page 6, second column, line 66, claim 11, strike out the word "which"; and that the said Letters Patent should be read with this correction therein that the same may conform to the record of the case in the Patent Office.

Signed and sealed this 10th day of January, A. D. 1939.

Henry Van Arsdale (Seal)

Acting Commissioner of Patents.